United States Patent
Woodward et al.

(10) Patent No.: US 12,515,497 B2
(45) Date of Patent: Jan. 6, 2026

(54) INTEGRATED CONVERGING VENTILIZATION SYSTEM

(71) Applicant: Rivian IP Holdings, LLC, Plymouth, MI (US)

(72) Inventors: Adam Thomas Woodward, San Clemente, CA (US); Robert Skapof, Coto de Caza, CA (US); Aaron Kirk Hensler, South Lyon, MI (US); Raj Shekar Vaghmare, Northville, MI (US); Tammie Lee Cava, Lincoln Park, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 439 days.

(21) Appl. No.: 18/146,334

(22) Filed: Dec. 23, 2022

(65) Prior Publication Data
US 2024/0208302 A1   Jun. 27, 2024

(51) Int. Cl.
*B60H 1/24* (2006.01)
*B60H 1/00* (2006.01)
*B60N 2/04* (2006.01)
*B62D 1/19* (2006.01)

(52) U.S. Cl.
CPC ......... *B60H 1/242* (2013.01); *B60H 1/00564* (2013.01); *B60N 2/04* (2013.01); *B62D 1/192* (2013.01)

(58) Field of Classification Search
CPC ............... B60H 1/242; B60H 1/00564; B60H 1/00871; B60H 1/3414
See application file for complete search history.

(56) References Cited

U.S. PATENT DOCUMENTS

| | | | | |
|---|---|---|---|---|
| 4,562,957 A * | 1/1986 | Nakagawa | ........... | B60H 1/2225 219/202 |
| 7,614,682 B1 * | 11/2009 | Major | ................ | B60H 1/00292 296/154 |
| 12,263,715 B2 * | 4/2025 | Harris | .................. | B60H 1/3414 |
| 2013/0344791 A1 * | 12/2013 | Wang | ................ | B60H 1/00871 454/155 |

OTHER PUBLICATIONS

NIO © 2023. NIOeT7, "Ready for tomorrow", NIO ET7: Our electric sedan with a range of up to 1000 km, located at: https://www.nio.com/et7, retrieved on Jan. 9, 2023.
TESLA (2022). Model S Owner's Manual. "Climate Controls, Overview of Climate Controls", Located at: https://www.tesla.com/ownersmanual/models/en_us/GUID-4F3599A1-20D9-4A49-B4A0-5261F957C096.html, retrieved on Jan. 9, 2023.

* cited by examiner

*Primary Examiner* — Allen R. B. Schult
(74) *Attorney, Agent, or Firm* — Patterson + Sheridan, LLP

(57) ABSTRACT

Particular embodiments may provide an airflow control system including a movable air duct, a lower vent, and an upper vent. The movable air duct may be configured to move with adjustments to a steering column. The lower vent may be adjustable in connection with the steering column. The lower vent may include a curvature that directs a lower airflow stream from the movable air duct. The upper vent may be above the lower vent. The upper vent may direct an upper airflow stream. The upper airflow stream may intersect the lower airflow stream to form a merged airflow stream.

16 Claims, 8 Drawing Sheets

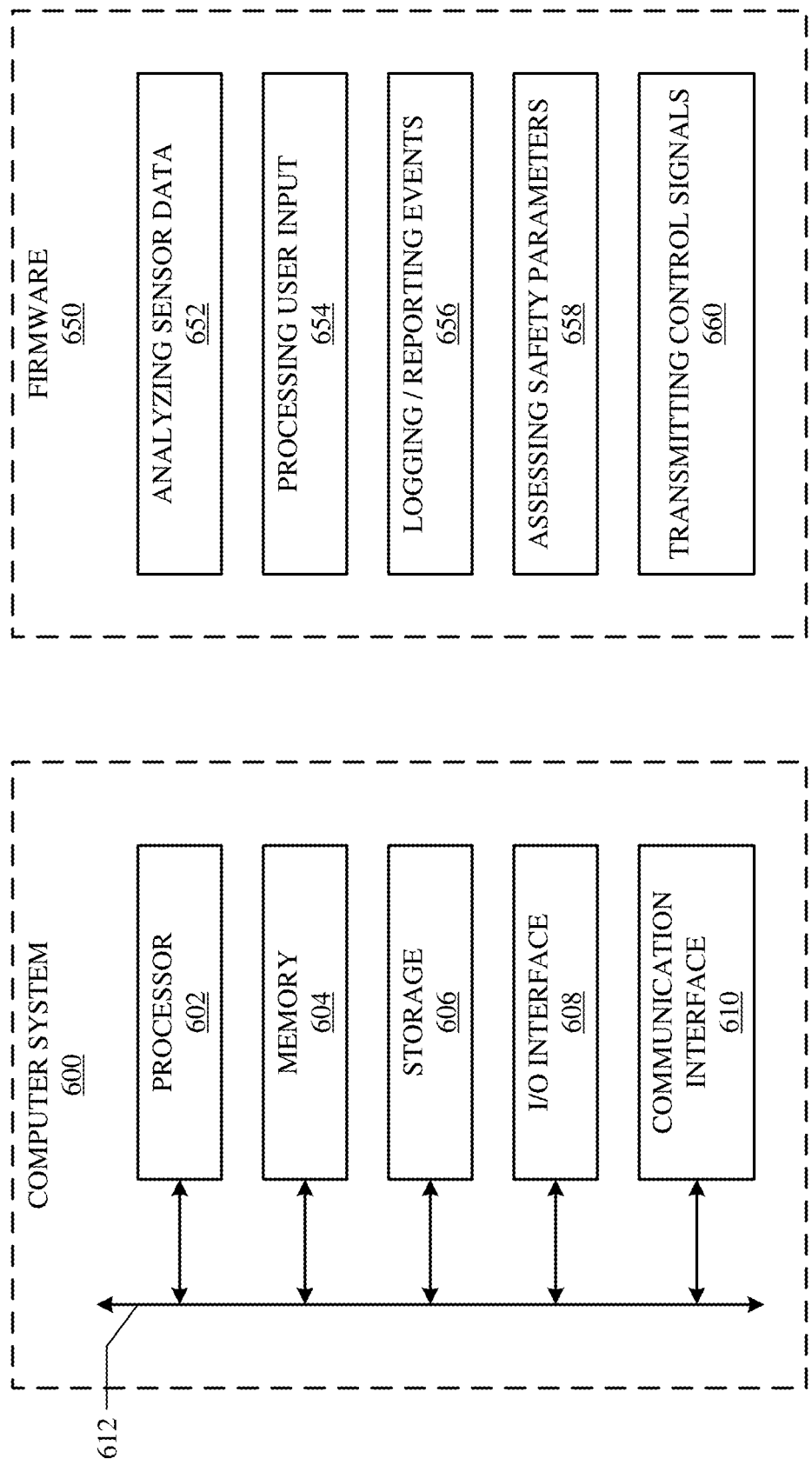

INTEGRATED CONVERGING VENTILATION SYSTEM

INTRODUCTION

Ventilation of a vehicle may be provided by fixed air vents to the left and right of a steering column or a steering wheel. However, such air vents may excessively cool or heat one area and insufficiently cool or heat another area. Consequently, a user may be unable to set a comfortable or suitable climate control setting.

BRIEF SUMMARY

In particular embodiments, an airflow control system may include a movable air duct, a lower vent, and an upper vent. The movable air duct may be configured to move based on adjustments to a steering column. The lower vent may be adjustable with the steering column. The lower vent may include a curvature that directs a lower airflow stream from the movable air duct. The upper vent may be proximate to the lower vent. The upper vent may direct an upper airflow stream. The upper airflow stream may intersect with the lower airflow stream to form a merged airflow stream. An airflow stream may include an airflow streamline. The embodiments herein are not necessarily limited to the stacked vent configuration. In particular embodiments, the airflow control system may include a first vent and a second vent. The first vent may be adjacent to a second vent. The first vent may also be proximate to the second vent.

In particular embodiments, a direction of the merged airflow stream may be based on an airflow ratio. The airflow ratio may be a flow rate of the lower airflow stream and a flowrate of the upper airflow stream. Increasing the airflow ratio may direct the merged airflow stream away from the steering column. Decreasing the airflow ratio may direct the merged airflow stream to closer to the steering column. A flow selector may be configured to vary the airflow ratio. The flow selector may direct at least a part of the lower airflow stream to the lower vent through the movable air duct. The airflow ratio may be based on a steering column position, a driver's seat position, a passenger's seat, or a cargo area configuration. The airflow ratio may be increased when the steering column position is lowered or when the driver's seat position is moved towards the steering column. The airflow ratio may be decreased when the steering column position is raised or when the driver's seat position is moved away from the steering column.

In particular embodiments, the lower vent may direct the lower airflow stream above a driver's seat, a passenger's seat, or a cargo area. The lower airflow stream directed above a driver's seat, a passenger's seat, or a cargo area may provide ambient airflow.

In particular embodiments, the airflow control system may include a lower vane and an upper vane. The lower vane may be proximal to the lower vent. The lower vane may direct a lateral component of the lower airflow stream. The upper vane may be proximal to the upper vent. The upper vane may direct a lateral component of the upper airflow stream. The lower vane may split the lower airflow stream around the steering column. The upper vane may split the upper airflow stream around the steering column. The lower vane or the upper vane may be adjustable. The lower vane or the upper vane may be adjusted by an actuator. The actuator may comprise a motor. The lower vane and a second lower vane may be independently adjustable. The upper vane and a second upper vane may be independently adjustable. When adjusted, the lower vane and the second lower vane, or the upper vane and the second upper vane, may direct a lateral component of the upper airflow stream in a same direction or in different directions.

In particular embodiments, the upper vent or the lower vent may be proximate to an instrument cluster. Proximate to the upper vent and the instrument cluster may be a gap hider. The gap hider may be configured to hide the gap between the lower vent and the instrument cluster when the steering column is adjusted.

In particular embodiments, the airflow control system may include a cover shroud. The cover shroud may be adjacent to the lower vent. The cover shroud may direct the lower airflow stream. The cover shroud may direct the lower airflow stream upwards and away from the steering column. The cover shroud may include a shroud curvature that directs the lower airflow stream. The shroud curvature may include a curve and a side curve. The curve may direct the airflow stream upwards. The curve may also direct the airflow away from the steering column. The side curve may intersect with the curve. The side curve may smooth a portion of the lower airflow stream that is not directed by the curve.

In particular embodiments, the movable air duct may include a flexible material or a mechanical joint. The flexible material may include a thermoplastic elastomer. The mechanical joint may include a ball joint or a telescoping joint.

In particular embodiments, the lower vent, the movable air duct, or the steering column may be configured to collapse when impacted.

In some embodiments, the direction of the airflow stream is adjustable. The adjustments may be selected by a user. The adjustments may also be based on a position of a steering column or a driver's seat.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 6A is a schematic of an example computer system.

FIG. 6B illustrates example firmware for a vehicle ECU.

DETAILED DESCRIPTION

Figure 1:
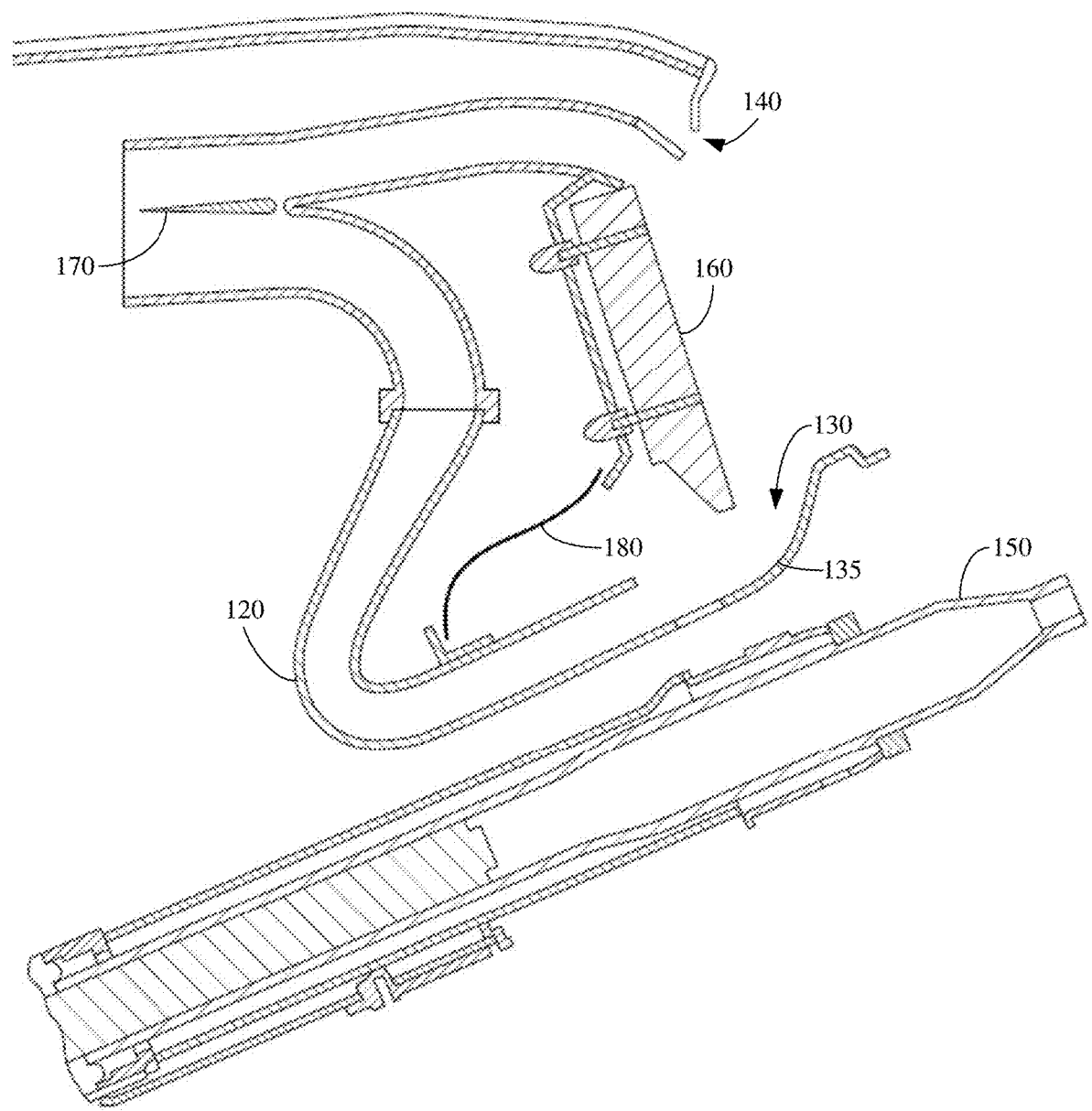
FIG. 1 illustrates an example side cutaway view of an airflow control system.

In particular embodiments, an airflow control system may include a movable air duct, a lower vent, and an upper vent. The movable air duct may be configured to move based on adjustments to a steering column. The lower vent may be adjustable with the steering column. The lower vent may include a curvature that directs a lower airflow stream from the movable air duct. The upper vent may be proximate to the lower vent. The upper vent may direct an upper airflow stream. The upper airflow stream may intersect with the lower airflow stream to form a merged airflow stream. An airflow stream may include an airflow streamline. The embodiments herein are not necessarily limited to the stacked vent configuration. In particular embodiments, the airflow control system may include a first vent and a second vent. The first vent may be adjacent to a second vent. The first vent may also be proximate to the second vent.

In particular embodiments, a direction of the merged airflow stream may be based on an airflow ratio. The airflow ratio may be a flow rate of the lower airflow stream and a flowrate of the upper airflow stream. Increasing the airflow ratio may direct the merged airflow stream away from the steering column. Decreasing the airflow ratio may direct the merged airflow stream to closer to the steering column. A flow selector may be configured to vary the airflow ratio. The flow selector may direct at least a part of the lower airflow stream to the lower vent through the movable air duct. The airflow ratio may be based on a steering column position, a driver's seat position, a passenger's seat, or a cargo area configuration. The airflow ratio may be increased when the steering column position is lowered or when the driver's seat position is moved towards the steering column. The airflow ratio may be decreased when the steering column position is raised or when the driver's seat position is moved away from the steering column.

In particular embodiments, the lower vent may direct the lower airflow stream above a driver's seat, a passenger's seat, or a cargo area. The lower airflow stream directed above a driver's seat, a passenger's seat, or a cargo area may provide ambient airflow.

In particular embodiments, the airflow control system may include a lower vane and an upper vane. The lower vane may be proximal to the lower vent. The lower vane may direct a lateral component of the lower airflow stream. The upper vane may be proximal to the upper vent. The upper vane may direct a lateral component of the upper airflow stream. The lower vane may split the lower airflow stream around the steering column. The upper vane may split the upper airflow stream around the steering column. The lower vane or the upper vane may be adjustable. The lower vane or the upper vane may be adjusted by an actuator. The actuator may comprise a motor. The lower vane and a second lower vane may be independently adjustable. The upper vane and a second upper vane may be independently adjustable. When adjusted, the lower vane and the second lower vane, or the upper vane and the second upper vane, may direct a lateral component of the upper airflow stream in a same direction or in different directions.

In particular embodiments, the upper vent or the lower vent may be proximate to an instrument cluster. Proximate to the upper vent and the instrument cluster may be a gap hider. The gap hider may be configured to hide the gap between the lower vent and the instrument cluster when the steering column is adjusted.

In particular embodiments, the airflow control system may include a cover shroud. The cover shroud may be adjacent to the lower vent. The cover shroud may direct the lower airflow stream. The cover shroud may direct the lower airflow stream upwards and away from the steering column. The cover shroud may include a shroud curvature that directs the lower airflow stream. The shroud curvature may include a curve and a side curve. The curve may direct the airflow stream upwards. The curve may also direct the airflow away from the steering column. The side curve may intersect with the curve. The side curve may smooth a portion of the lower airflow stream that is not directed by the curve.

In particular embodiments, the movable air duct may include a flexible material or a mechanical joint. The flexible material may include a thermoplastic elastomer. The mechanical joint may include a ball joint or a telescoping joint.

In particular embodiments, the lower vent, the movable air duct, or the steering column may be configured to collapse when impacted.

In some embodiments, the direction of the airflow stream is adjustable. The adjustments may be selected by a user. The adjustments may also be based on a position of a steering column or a driver's seat.

FIG. 1 illustrates an example side cutaway view of an example airflow control system 110. In some embodiments, airflow control system 110 may include movable air duct 120, lower vent 130, and upper vent 140.

In some embodiments, movable air duct 120 may be configured to move with adjustments to steering column 150. Adjustments to steering column 150 may include positional adjustments in the up, down, left, and right direction. Such adjustments may allow steering column 150 to be accessible while maximizing interior space (e.g., cargo capacity). Adjustments to steering column 150 may also include telescoping or tilting towards or away from a driver's seat. Adjustments to steering column 150 may also include telescoping or tilting towards or away from a passenger seat, cargo area, among other possibilities. For example, if steering column 150 is adjusted, movable air duct 120 may remain connected and may do so without damage to airflow control system 110. Movable air duct 120 may include a flexible material or a mechanical joint. The flexible material may include a thermoplastic elastomer. The mechanical joint may include a ball joint or a telescoping joint.

Lower vent 130 may be adjustable in connection with steering column 150. For example, lower vent 130 may be coupled with steering column 150 and may move with steering column 150. Lower vent 130 may include curvature 135 that directs a lower airflow stream. The lower airflow stream at lower vent 130 may be from movable air duct 120.

Upper vent 140 may be above lower vent 130. Upper vent 140 may direct an upper airflow stream. The upper airflow stream may be directed to intersect the lower airflow stream to form a merged airflow stream. Upper vent 140 may be positioned above lower vent 130 such that the upper airflow stream may intersect the lower airflow stream. For example, upper vent 140 may be positioned directly above lower vent 130. In another example, upper vent 140 may be positioned above and offset from lower vent 130 and the upper airflow stream may be directed to intersect the lower airflow stream. In some embodiments, lower vent 130 or upper vent 140 may be proximate to instrument cluster 160. Lower vent 130 or upper vent 140 may be positioned to not block instrument cluster 160. Lower vent 130 or upper vent 140 may be positioned above or below instrument cluster 160. An advantage of the airflow control system is the vents do not need to be placed in the same position as traditional vents (e.g., between a cluster and a information display, or above the information display). The positioning of lower vent 130 and upper vent 140 may enable designs that are incompatible with traditional vent positioning. Another advantage of the airflow control system is a more uniform heating or cooling of a driver or passenger. Traditional solutions may result in the airflow stream being directed at a driver's hands when the user is attempting to heat or cool themselves as a result of the traditional vent positioning. Thus, the driver's hands may be too hot or too cold, or result in increased time for the user to achieve the desired temperature, and thus comfort. In contrast, the airflow control system may provide an airflow stream through the wheel and thus the air stream may reach a body of the user without being blocked or intercepted by a user's hands.

In some embodiments, the merged airflow stream may be based on an airflow ratio of a flow rate of the lower airflow stream and a flow rate of the upper airflow stream. Varying the airflow ratio may cause a direction of the merged airflow stream to vary upwards or downwards. For example, increasing the airflow ratio may direct the merged airflow stream upwards. In another example, decreasing the airflow ratio may direct the merged airflow stream downwards.

In some embodiments, the airflow ratio may be varied by flow selector 170. Flow selector 170 may vary the airflow ratio by modifying the flow rate of the lower airflow stream and the flow rate of the upper airflow stream. To modify the flow rate, flow selector 170 may be configured to block or restrict a portion of lower vent 130 or upper vent 140. Flow selector 170 may be configured to block or restrict a portion of movable air duct 120. Flow selector 170 may direct 0% to 100% of the lower airflow stream to lower vent 130 through movable air duct 120. Flow selector 170 may direct 0% to 100% of the upper airflow stream to upper vent 140.

In some embodiments, the airflow ratio may be based on a position of steering column 150. The airflow ratio may be modified when the position of steering column 150 is adjusted to maintain the direction of the merged airflow stream. The direction of the merged airflow stream may be relative to the vehicle. For example, a merged airflow stream may originally be directed to an upper-back area of the driver's seat or a passenger's seat, or may be directed to a cargo area, among other possibilities. In this example, steering column 150 may be adjusted upwards and the airflow ratio may be decreased to direct the merged airflow stream downwards such that the approximate direction of the merged airflow stream is still directed to the upper-back area of the driver's seat or the passenger's seat. In other words, the airflow ratio may be modified such that the direction of the merged airflow stream may be independent of the steering column position.

In some embodiments, the airflow ratio may be based on a driver's seat position, a passenger's seat position, or a cargo area configuration. For example when the driver's seat position or the passenger's seat position is adjusted towards steering column 150, the direction of the merged airflow stream may be adjusted downwards. In this example, adjusting the direction of the merged airflow stream downwards may result in the merged airflow stream being directed to approximately the same region of the driver's seat or the passenger's seat. In another example, the driver's seat position may be adjusted away from steering column 150, and the direction of the merged airflow stream may be adjusted upwards. The driver's seat position may be used to approximate attributes (e.g., height) of a driver.

In some embodiments, the airflow ratio may be based on a combination of the position of steering column 150 and the position of the driver's seat or a position of the passenger's seat. The combination may enable additional attributes (e.g., arm length, torso length) to be approximated or determined. The combination may also enable the merged airflow stream to be directed to the same region of each and any driver's body or passenger's body. For example, for any combination of position of steering column 150 and the driver's seat position, a driver may be able to select the torso area and the merged airflow stream will be directed to the torso area of the driver. In this example, the driver may further configure the direction of the merged airflow stream, but is not required to do so for the merged airflow stream to be directed to the torso area.

In some embodiments, lower vent 130 may be configured to direct the airflow stream above a driver's seat, a passenger's seat, or a cargo area to provide ambient airflow. Ambient airflow may modify the temperature of a cabin of the vehicle without directing a merged airflow stream directly at the driver, any other occupant (e.g., passenger), or cargo in the vehicle. Ambient airflow may also promote mixing of the air within the cabin, or other compartment, of the vehicle. Mixing of the air may prevent stagnant (e.g., stuffy) air. Ambient airflow may also disperse smells (e.g., car scents) throughout the cabin or other compartment of the vehicle.

In some embodiments, movable air duct 120, lower vent 130, upper vent 140, or steering column 150 may be configured to collapse when impacted. Collapsing movable air duct 120, lower vent 130, upper vent 140, or steering column 150 may be desirable to improve passenger safety as part of a passive safety system.

In some embodiments, airflow control system 110 may include gap hider 180. Gap hider 180 may be proximate to lower vent 130. Gap hider 180 may also be proximate to instrument cluster 160. Gap hider 180 may hide the gap between lower vent 130 and instrument cluster 180. Gap hider 180 may hide the gap at a range of positions of steering column 150, wherein the range includes every position of steering column 150. Hiding the gap between lower vent 130 and instrument cluster 160, may be desirable for aesthetic reasons. It may also be desirable to decrease the dust accumulation or debris intrusion between lower vent 130 and instrument cluster 180.

Figure 2A:
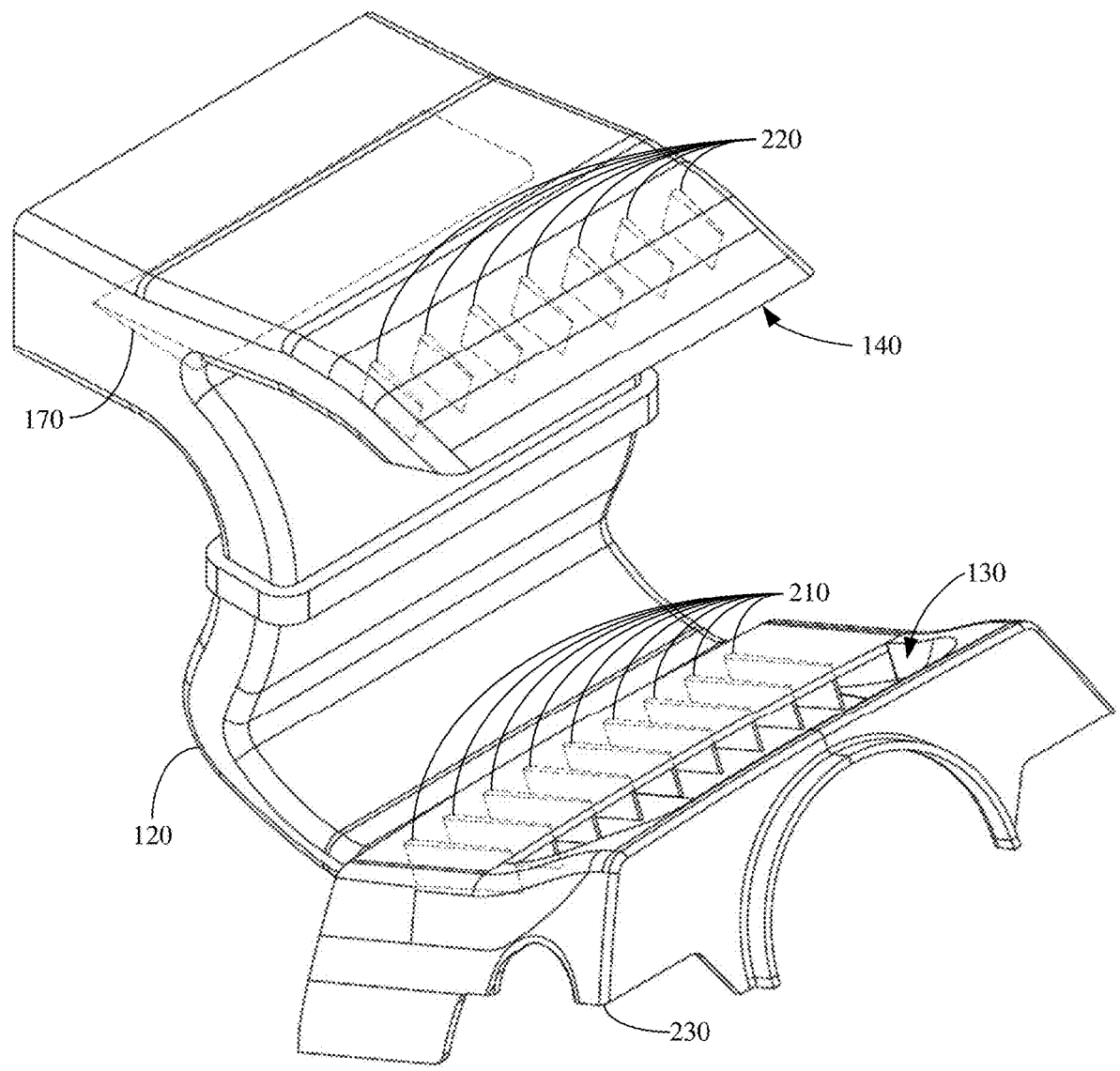
FIG. 2A illustrates an example orthographic view of an airflow control system.
Figure 2B:
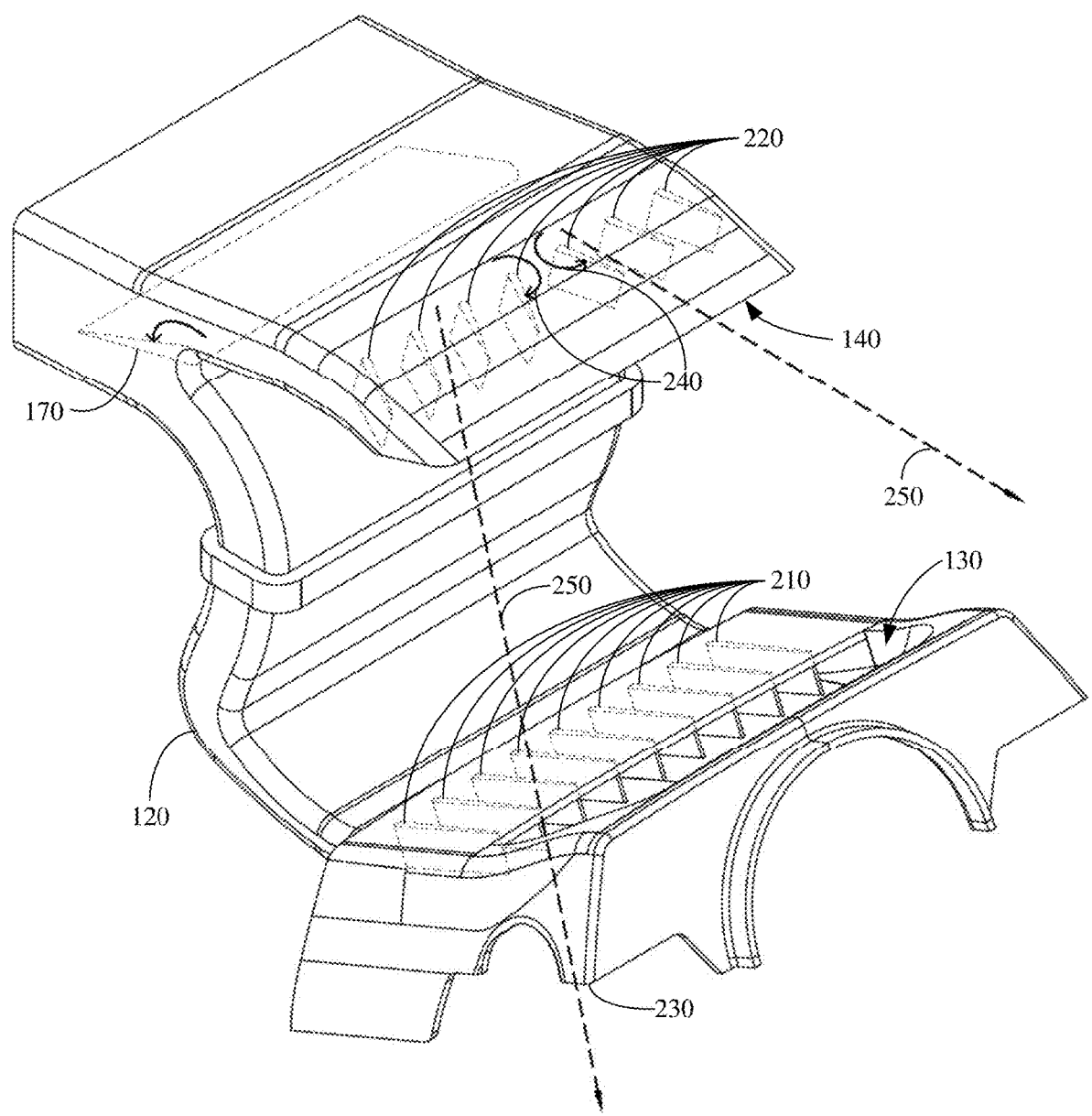
FIG. 2B illustrates an example orthographic view of an airflow control system with symmetrically adjusted vanes.
Figure 2C:
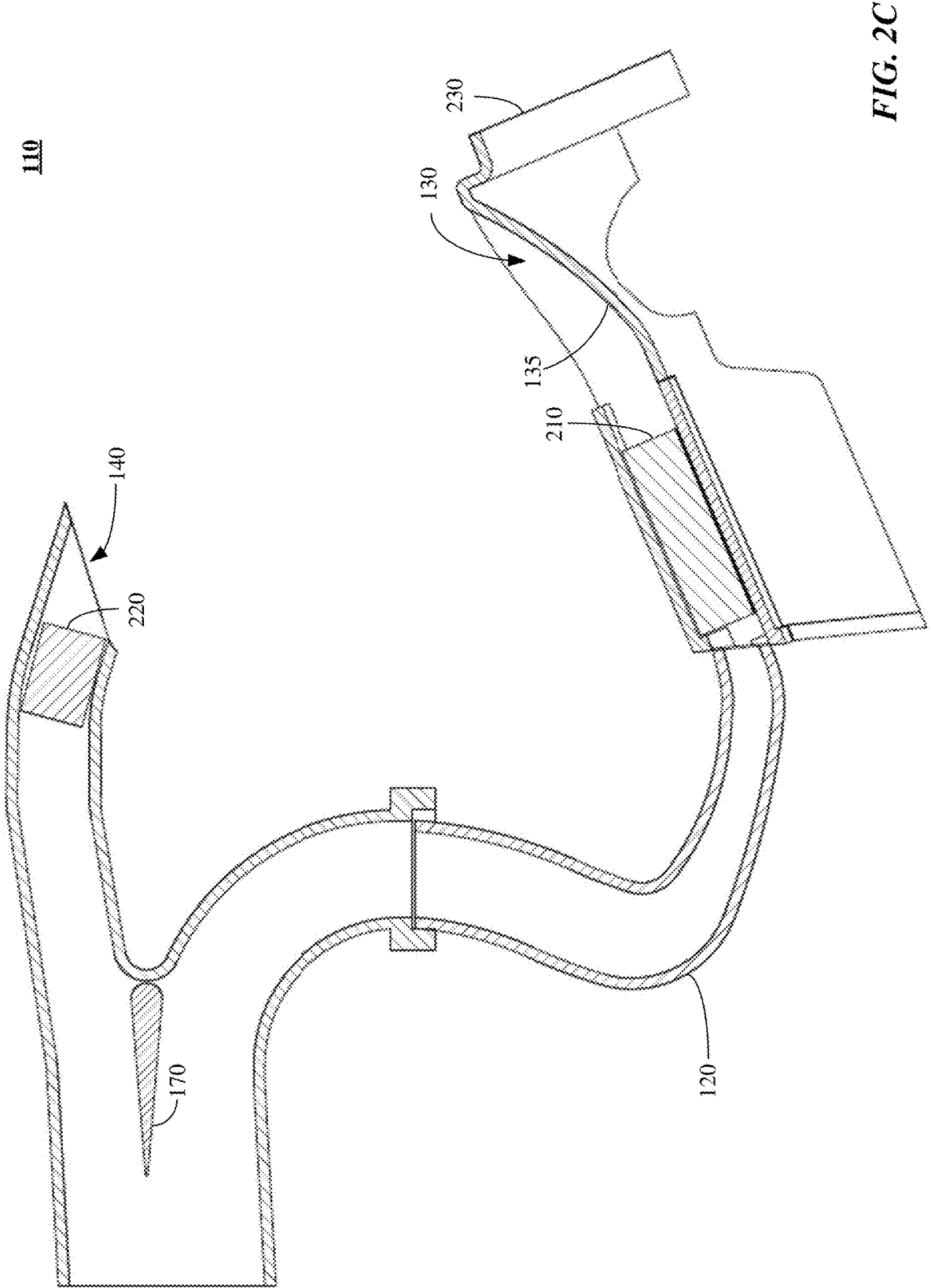
FIG. 2C illustrates an example side cutaway view of an airflow control system.

FIG. 2A illustrates an example orthographic view of airflow control system 110. FIG. 2B illustrates an example orthographic view of airflow control system 110 with symmetrically adjusted vanes. FIG. 2C illustrates an example side cutaway view of airflow control system 110. In some embodiments, airflow control system 110 may further include lower vane 210 or upper vane 220. Lower vane 210 may be proximal to lower vent 130. Lower vane 210 may further direct the lower airflow stream. Upper vane 220 may be proximal to upper vent 140. Upper vane 220 may further direct the upper airflow stream.

In some embodiments, lower vane 210 or upper vane 220 may split the lower airflow stream around steering column 150. Upper vane 220 may split the upper airflow stream around steering column 150.

In some embodiments, lower vane 210 or upper vane 220 may be adjustable. Lower vane 210 and upper vane 220 may be independently adjustable (e.g., lower vane may be adjusted in one direction, and upper vane may be adjusted in a different direction). A vane of lower vane 210 and a second lower vane 210 may be independently adjustable. A vane of upper vane 220 and a second upper vane 220 may be independently adjustable. The upper vanes may be pointed outwards symmetrically 240 away from the steering column. The upper vanes in this configuration may allow the air stream to reach the driver, passenger, or cargo without interference with the steering column. The upper vanes in this configuration may direct the air outwards 250 (e.g., around the steering column or steering wheel). For example, the upper vanes may be pointed symmetrically away from the steering column to provide airflow to a driver or passenger's lower region. Generally speaking, such a configuration may allow for the merged airflow stream to be directed in downwards without interference with the steering column. A vane of lower vane 210 and a vane of upper vane 220 may be linked together such that the vanes are adjusted together (e.g., in the same direction). Lower vane 210 or upper vane 220 may be adjusted by an actuator. An actuator may include a motor.

In some embodiments, airflow control system 110 may include cover shroud 230. Cover shroud 230 may be proximate to the lower vent. Cover shroud 230 may further be adjacent to the lower vent. Cover shroud 230 may include a shroud curvature. Cover shroud 230 may further direct the lower airflow stream.

Figure 3:
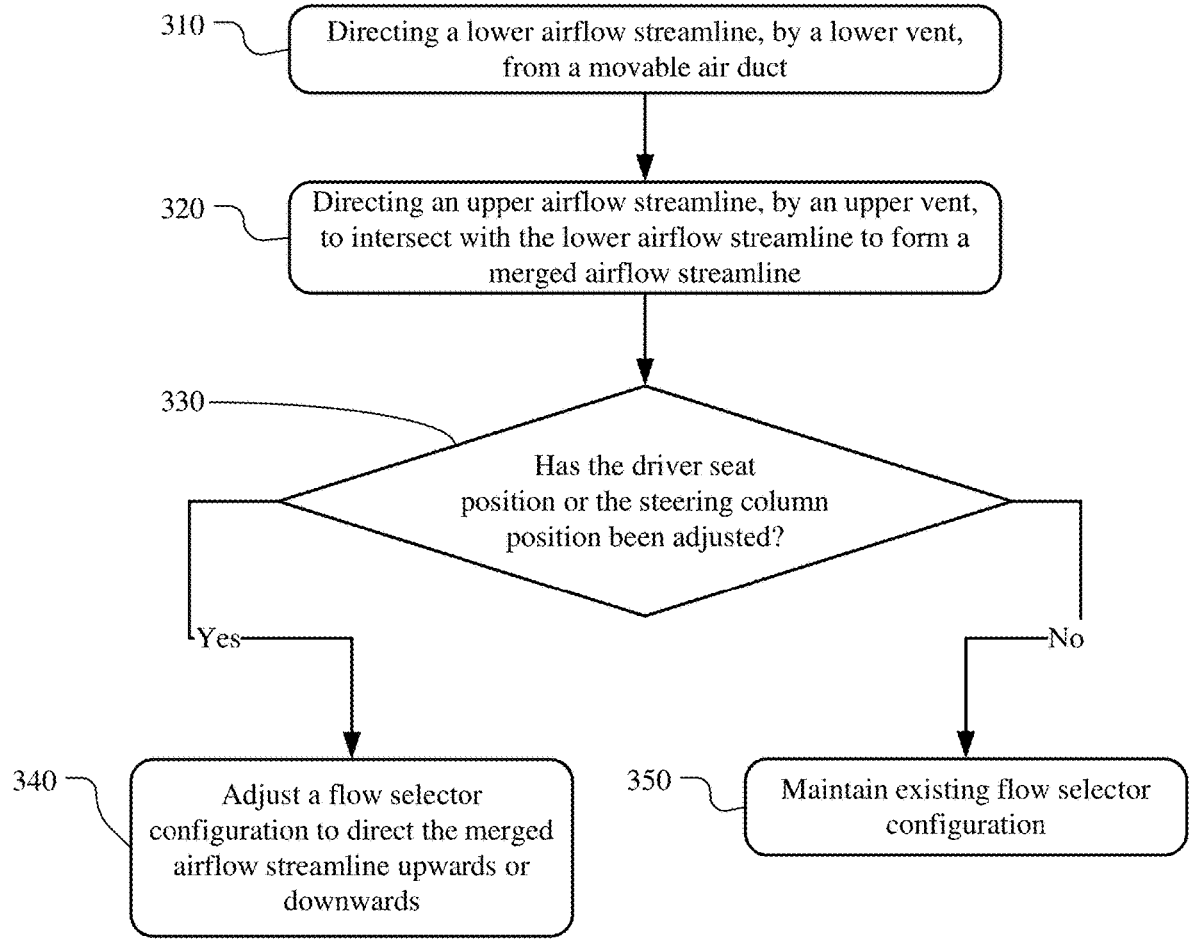
FIG. 3 is a flowchart illustrating steps of a method for controlling air flow for a vehicle.

FIG. 3 is a flowchart illustrating steps of a method 300 for a control module of a vehicle to control air flow within the vehicle. Method 300 may begin at step 310 with directing a lower airflow stream, by lower vent 130, from movable air duct 120. Method 300 may then continue at step 320 with directing an upper airflow stream, by upper vent 140, to intersect with the lower airflow stream to form a merged airflow stream. At decision point 330, the control module may determine whether the driver's seat position, passenger's seat position, cargo area configuration, or steering column 150 position has been adjusted. If yes, method 300 may then continue at step 340 with adjusting a configuration of flow selector 170 to direct the merged airflow stream upwards or downwards. Otherwise, if no, then at step 350, maintain existing configuration of flow selector 170. In particular embodiments, airflow control system 110 may consider other factors when determining whether or not to adjust the configuration of flow selector 170, as well as the level of adjustment, such as, by way of example and not limitation, preset driver or passenger preferences, a temperature of the air flow, an ambient temperature within the vehicle, whether or not a window of the vehicle next to the driver (or other windows) are open and by how much, a drive mode of the vehicle, or a speed of the vehicle.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for controlling air flow for a vehicle including the particular steps of the method of FIG. 3, this disclosure contemplates any suitable method for controlling air flow 4 for a vehicle including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
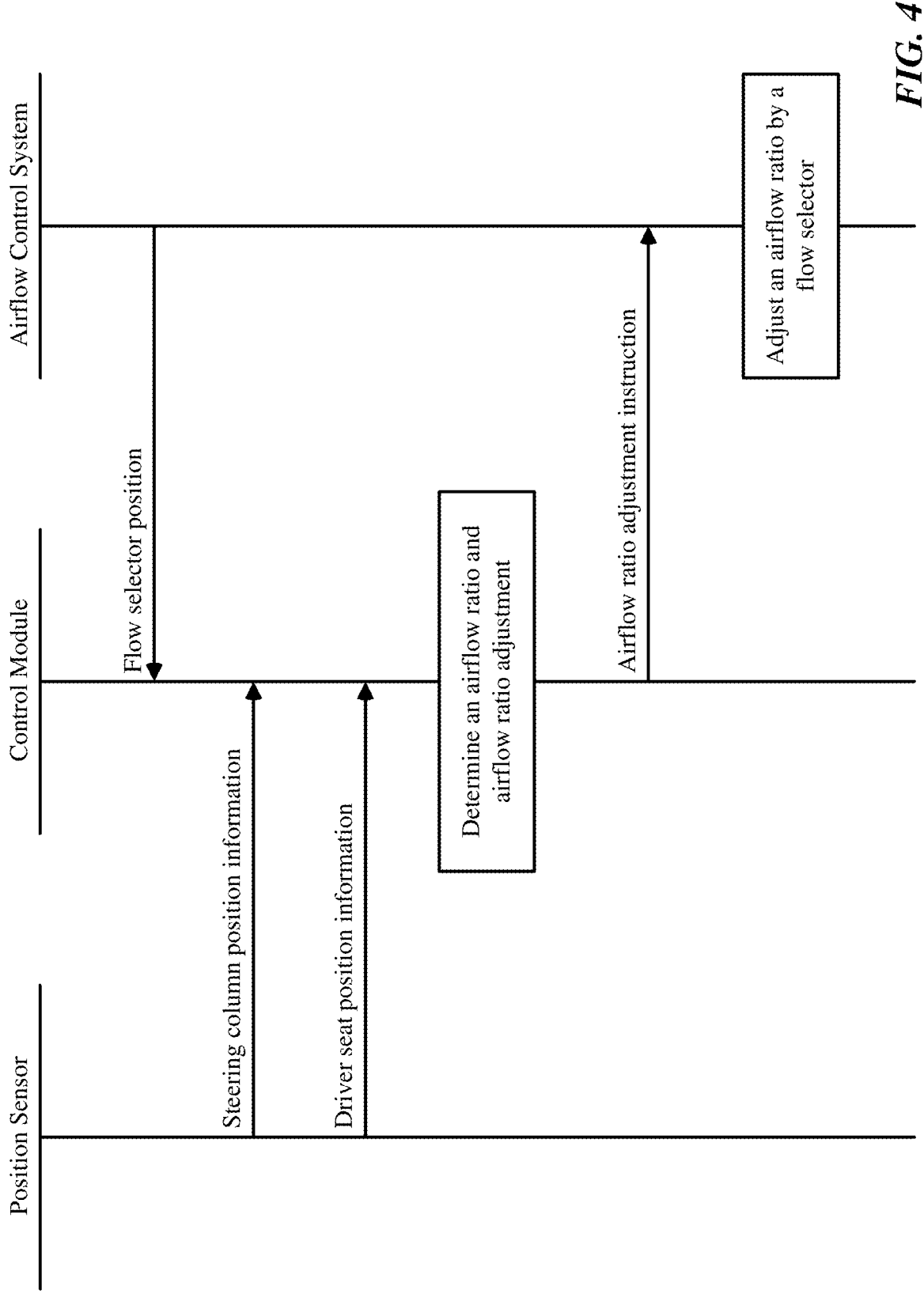
FIG. 4 is a diagram illustrating interactions between a vehicle, a position sensor, and an airflow control system.

FIG. 4 is a diagram illustrating an example flow of interactions between a position sensor, airflow control system 110 and a control module of the vehicle. Airflow control system 110 may provide a flow selector position to the control module. The position sensor may provide position information of steering column 150, position information of a driver's seat or passenger's seat, or a cargo area layout to the control module. The control module may determine an airflow ratio and airflow ratio adjustment. The control module may provide the airflow ratio adjustment instruction to airflow control system 110. The airflow control system 110 may then adjust an airflow ratio by flow selector 170.

Figure 5:
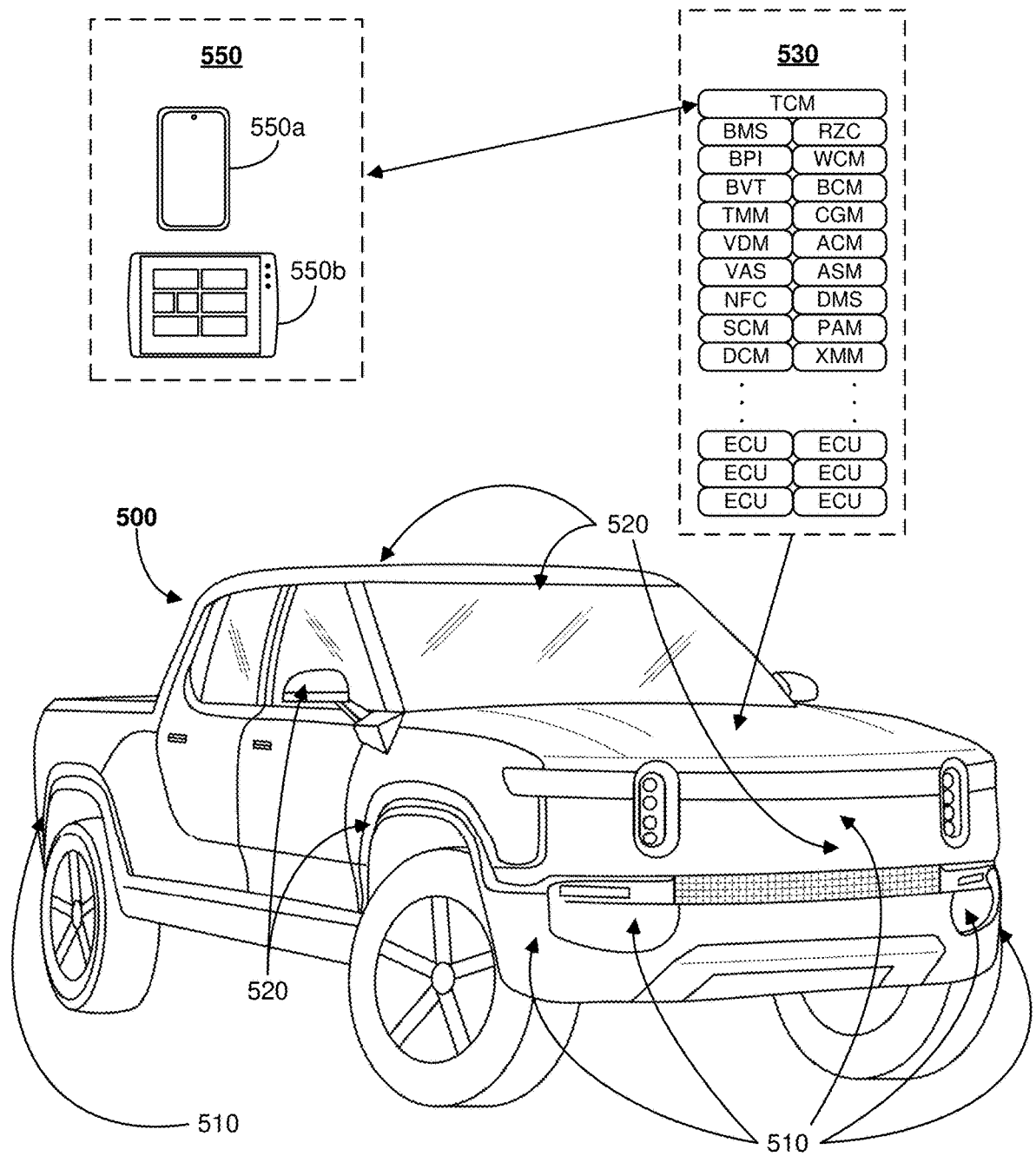
FIG. 5 illustrates an example vehicle.

FIG. 5 illustrates an example vehicle 500. Vehicle 500 may include multiple sensors 510, multiple cameras 520, and a control system 530. In some embodiments, vehicle 500 may be able to pair with a computing device 550 (e.g., smartphone 550*a*, tablet computing device 550*b*, or a smart vehicle accessory). As an example and not by way of limitation, a sensor 510 may be an accelerometer, a gyroscope, a magnetometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 520 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 500 may include various controllable components (e.g., doors, seats, windows, lights, HVAC, entertainment system, security system), instrument and information displays and/or interactive interfaces, functionality to pair a computing device 550 with the vehicle (which may enable control of certain vehicle functions using the computing device 550), and functionality to pair accessories with the vehicle, which may then be controllable through an interactive interface in the vehicle or through a paired computing device 550.

Control system 530 may enable control of various systems on-board the vehicle. As shown in FIG. 5, control system 530 may comprise one or more electronic control units (ECUs), each of which are dedicated to a specific set of functions. Each ECU may be a computer system (as described further in FIG. 5), and each ECU may include functionality provide by one or more of the example ECUs described below.

Features of embodiments as described herein may be controlled by a Thermal Management Module (TMM) ECU. The TMM ECU may provide electronic controls for HVAC components that control the temperature within a passenger cabin of the vehicle, including, by way of example and not limitation, sensing cabin temperature, heating and cooling of the cabin, and controlling HVAC mode (foot mode, defrost/ demist), the electronic air compressor, the HVAC blower, the air vents, and the cabin heater. The TMM ECU may also or alternatively control heating and cooling of the battery pack and cooling of drive units (inverters), including, by way of example and not limitation, controlling the speed of the radiator fan, heating and cooling of energy storage system (ESS), monitoring ESS coolant temperature sensors, cooling of powertrain, and monitoring powertrain coolant temperature sensors.

Features of embodiments as described herein may be controlled by one or more ECUs that provide functionality to control interior cabin components of the vehicle. A Seat Control Module (SCM) ECU may provide functionality to control seat movement (e.g., slide, tilt, recline, height, lumbar support), steering column movement (e.g., reach, rake), seat heater(s), or seat ventilation.

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 530.

Vehicle 500 may include one or more additional ECUs, such as, by way of example and not limitation: a Central Gateway Module (CGM) ECU, a Telematics Control Module (TCM) ECU, a Vehicle Dynamics Module (VDM) ECU, a Vehicle Access System (VAS) ECU, a Near-Field Communication (NFC) ECU, a Body Control Module (BCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 500 is an electric vehicle, one or more ECUs may provide functionality related to the battery pack of the vehicle, such as a Battery Management System (BMS) ECU, a Battery Power Isolation (BPI) ECU, and/or a Balancing Voltage Temperature (BVT) ECU.

FIG. 6A illustrates an example computer system 600. Computer system 600 may include a processor 602, memory 604, storage 606, an input/output (I/O) interface 608, a communication interface 610, and a bus 612. Although this disclosure describes one example computer system including specified components in a particular arrangement, this disclosure contemplates any suitable computer system with any suitable number of any suitable components in any suitable arrangement. As an example and not by way of limitation, computer system 600 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 600 may include one or more computer systems 600; be unitary or distributed; span multiple locations, machines, or data centers; or reside in a cloud, which may include one or more cloud components in one or more networks. Where appropriate, computer system(s) 600 may perform, at different times or at different locations, in real time or in batch mode, one or more steps of one or more methods described or illustrated herein.

Processor 602 (e.g., compute units) may include hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606 (e.g., storage units). Processor 602 may include one or more internal caches for data, instructions, or addresses.

In particular embodiments, memory 604 includes main memory for storing instructions for processor 602 to execute or data for processor 602 to operate on. In particular embodiments, one or more memory management units (MMUs) reside between processor 602 and memory 604 and facilitate accesses to memory 604 requested by processor 602. In particular embodiments, memory 604 includes random access memory (RAM). This disclosure contemplates any suitable RAM.

In particular embodiments, storage 606 includes mass storage for data or instructions. As an example and not by way of limitation, storage 606 may include a removable disk drive, flash memory, an optical disc, a magneto-optical disc, magnetic tape, or a Universal Serial Bus (USB) drive or two or more of these. Storage 606 may include removable or fixed media and may be internal or external to computer system 600. Storage 606 may include any suitable form of non-volatile, solid-state memory or read-only memory (ROM).

In particular embodiments, I/O interface 608 includes hardware, software, or both, providing one or more interfaces for communication between computer system 600 and one or more input and/or output (I/O) devices. Computer system 600 may be communicably connected to one or more of these I/O devices, which may be incorporated into, plugged into, paired with, or otherwise communicably connected to vehicle 500 (e.g., through the TCM ECU). An input device may include any suitable device for converting volitional user input into digital signals that can be processed by computer system 600, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 510 described above. An output device may include devices designed to receive digital signals from computer system 600 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 608 for them. I/O interface 608 may include one or more I/O interfaces 608, where appropriate.

In particular embodiments, communication interface 610 includes hardware, software, or both providing one or more interfaces for data communication between computer system 600 and one or more other computer systems 600 or one or more networks. Communication interface 610 may include one or more interfaces to a controller area network (CAN) or to a local interconnect network (LIN). Communication interface 610 may include one or more of a serial peripheral interface (SPI) or an isolated serial peripheral interface (isoSPI). In some embodiments, communication interface 610 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 612 includes hardware, software, or both coupling components of computer system 600 to each other. Bus 612 may include any suitable bus, as well as one or more buses 612, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 6B illustrates example firmware 650 for a vehicle ECU 600 as described with respect to control system 530. Firmware 650 may include functions 652 for analyzing sensor data based on signals received from sensors 510 or cameras 520 received through communication interface 610. Firmware 650 may include functions 654 for processing user input (e.g., directly provided by a driver of or passenger in vehicle 500, or provided through a computing device 550) received through I/O interface 608. Firmware 650 may include functions 656 for logging detected events (which may be stored in storage 606 or uploaded to the cloud), as well as functions for reporting detected events (e.g., to a driver or passenger of the vehicle through an instrument display or interactive interface of the vehicle, or to a vehicle manufacturer, service provider, or third party through communication interface 610). Firmware 650 may include functions 658 for assessing safety parameters (e.g., monitoring the temperature of a vehicle battery or the distance between vehicle 500 and nearby vehicles). Firmware 650 may include functions 660 for transmitting control signals to components of vehicle 500, including other vehicle ECUs 600.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An airflow control system comprising:
   a movable air duct configured to move based on adjustments to a steering column;
   a lower vent adjustable with the steering column, wherein the lower vent directs a lower airflow stream from the movable air duct; and
   an upper vent proximate to the lower vent, wherein an upper airflow stream, directed by the upper vent, intersects with the lower airflow stream to form a merged airflow stream, and wherein:
      a direction of the merged airflow stream is based on an airflow ratio of a flow rate of the lower airflow stream and a flow rate of the upper airflow stream such that increasing the airflow ratio directs the merged airflow stream away from the steering column and decreasing the airflow ratio directs the merged airflow stream closer to the steering column; and
      the airflow ratio is based on at least one of a steering column position or a driver's seat position according to at least one of the following:
         the airflow ratio is increased when the steering column position is lowered;
         the airflow ratio is decreased when the steering column position is raised;
         the airflow ratio is increased when the driver's seat position is moved towards the steering column; or
         the airflow ratio is decreased when the driver's seat position is moved away from the steering column.

2. The system of claim 1, further comprising a flow selector configured to vary the airflow ratio.

3. The system of claim 2, wherein the flow selector directs at least a part of the lower airflow stream to the lower vent through the movable air duct.

4. The system of claim 1, wherein the airflow ratio is based on a steering column position, wherein:
   the airflow ratio is increased when the steering column position is lowered; and
   the airflow ratio is decreased when the steering column position is raised.

5. The system of claim 1, wherein the airflow ratio is based on a driver's seat position, wherein:
   the airflow ratio is increased when the driver's seat position is moved towards the steering column; and the airflow ratio is decreased when the driver's seat position is moved away from the steering column.

6. The system of claim 1, wherein the lower vent further directs the lower airflow stream above a driver's seat to provide ambient airflow.

7. The system of claim 1, further comprising:
a lower vane, proximal to the lower vent, to further direct a lateral component of the lower airflow stream; or
an upper vane, proximal to the upper vent, to further direct a lateral component of the upper airflow stream.

8. The system of claim 7, wherein:
the lower vane splits the lower airflow stream around the steering column; or
the upper vane splits the upper airflow stream around the steering column.

9. The system of claim 7, wherein the lower vane or the upper vane is adjustable, and wherein the lower vane and the upper vane is adjusted by an actuator, wherein the actuator comprises a motor.

10. The system of claim 7, wherein:
a lower vane is independently adjustable from a second lower vane, such that the lower vane and the second lower vane direct the lateral component of the lower airflow stream in a same direction or in different directions; or
an upper vane is independently adjustable from a second upper vane, such that the upper vane and the second upper vane direct the lateral component of the upper airflow stream in a same direction or in different directions.

11. The system of claim 1, wherein the lower vent or the upper vent is proximate to an instrument cluster.

12. The system of claim 11, wherein a gap hider is proximate to the lower vent and the instrument cluster, wherein the gap hider is configured to hide a gap between the lower vent and the instrument cluster when the steering column is adjusted.

13. The system of claim 1, further comprising a cover shroud adjacent to the lower vent to further direct the lower airflow stream upwards and away from the steering column, wherein the cover shroud comprises a shroud curvature comprising:
a curve directing the lower airflow stream upwards and away from the steering column; and
a side curve intersecting with the curve, wherein the side curve smooths a portion of the lower airflow stream that is not directed by the curve.

14. The system of claim 1, wherein the lower vent, the movable air duct, or the steering column are configured to collapse when impacted.

15. A method of controlling air flow for a vehicle, comprising:
directing, by a control module of the vehicle and a lower vent, a lower airflow stream, wherein the lower vent is adjustable with a steering column; and
directing, by the control module and an upper vent, an upper airflow stream, wherein the upper airflow stream intersects with the lower airflow stream to form a merged airflow stream, and wherein:
a direction of the merged airflow stream is based on an airflow ratio of a flow rate of the lower airflow stream and a flow rate of the upper airflow stream such that increasing the airflow ratio directs the merged airflow stream away from the steering column and decreasing the airflow ratio directs the merged airflow stream closer to the steering column; and
the airflow ratio is based on at least one of a steering column position or a driver's seat position according to at least one of the following:
the airflow ratio is increased when the steering column position is lowered;
the airflow ratio is decreased when the steering column position is raised;
the airflow ratio is increased when the driver's seat position is moved towards the steering column; or
the airflow ratio is decreased when the driver's seat position is moved away from the steering column.

16. A non-transitory computer-readable medium comprising instructions that, when executed by one or more processors of one or more computing devices, cause the one or more processors to:
direct, by a control module of a vehicle, a lower airflow stream through a lower vent, wherein the lower vent is adjustable in connection with a steering column; and
direct, by the control module, an upper airflow stream through an upper vent, wherein the upper airflow stream intersects with the lower airflow stream to form a merged airflow stream, and wherein:
a direction of the merged airflow stream is based on an airflow ratio of a flow rate of the lower airflow stream and a flow rate of the upper airflow stream such that increasing the airflow ratio directs the merged airflow stream away from the steering column and decreasing the airflow ratio directs the merged airflow stream closer to the steering column; and
the airflow ratio is based on at least one of a steering column position or a driver's seat position according to at least one of the following:
the airflow ratio is increased when the steering column position is lowered;
the airflow ratio is decreased when the steering column position is raised;
the airflow ratio is increased when the driver's seat position is moved towards the steering column; or
the airflow ratio is decreased when the driver's seat position is moved away from the steering column.

\* \* \* \* \*